United States Patent
Ishii

(10) Patent No.: US 9,078,217 B2
(45) Date of Patent: Jul. 7, 2015

(54) USER EQUIPMENT, BASE STATION DEVICE, AND COMMUNICATION CONTROL METHOD

(75) Inventor: Hiroyuki Ishii, Yokohama (JP)

(73) Assignee: NTT DOCOMO, INC., Tokyo (JP)

(*) Notice: Subject to any disclaimer, the term of this patent is extended or adjusted under 35 U.S.C. 154(b) by 188 days.

(21) Appl. No.: 13/266,389

(22) PCT Filed: Apr. 22, 2010

(86) PCT No.: PCT/JP2010/057171
§ 371 (c)(1),
(2), (4) Date: Oct. 26, 2011

(87) PCT Pub. No.: WO2010/125969
PCT Pub. Date: Nov. 4, 2010

(65) Prior Publication Data
US 2012/0044898 A1    Feb. 23, 2012

(30) Foreign Application Priority Data

Apr. 27, 2009  (JP) ................................. 2009-108562
Feb. 15, 2010  (JP) ................................. 2010-030749

(51) Int. Cl.
| H04W 52/18 | (2009.01) |
| H04W 52/14 | (2009.01) |
| H04W 52/34 | (2009.01) |

(Continued)

(52) U.S. Cl.
CPC ............ *H04W 52/18* (2013.01); *H04W 52/146* (2013.01); *H04W 52/367* (2013.01); *H04W 52/42* (2013.01); *H04W 52/34* (2013.01)

(58) Field of Classification Search
USPC .................... 370/252, 329, 335, 464; 455/522
See application file for complete search history.

(56) References Cited

U.S. PATENT DOCUMENTS

| 6,839,335 B1 | 1/2005 | Sudo |
| 2001/0008524 A1 | 7/2001 | Ishii et al. |
| 2005/0207441 A1* | 9/2005 | Onggosanusi et al. ....... 370/464 |

(Continued)

FOREIGN PATENT DOCUMENTS

| JP | 05-048525 A | 2/1993 |
| JP | 2001-024618 A | 1/2001 |

(Continued)

OTHER PUBLICATIONS

3GPP, ETSI TS 136 101 v8.2.0, Nov. 2008.*

(Continued)

*Primary Examiner* — Michael Thier
*Assistant Examiner* — Yaotang Wang
(74) *Attorney, Agent, or Firm* — Osha Liang LLP

(57) ABSTRACT

A radio base station including a user equipment configured to execute radio communication with a base station device in a mobile communication system. The user equipment includes a control signal reception unit configured to receive a control signal providing instructions to transmit an uplink signal and an uplink signal transmission unit configured to transmit the uplink signal to the base station device on a basis of the control signal, the uplink signal transmission unit is configured to set a maximum value of transmission power of the uplink signal to be smaller than rated power defined by the mobile communication system on a basis of at least one of a parameter notified by the control signal and a number of transmission antennas or transmitters used for transmission of an uplink signal.

2 Claims, 10 Drawing Sheets

| MODULATION | CHANNEL BW | TRANSMISSION BANDWIDTH CONFIGURATION (RB) | FREQUENCY INTERVALS AMONG A PLURALITY OF FREQUENCY CARRIERS | MPR |
|---|---|---|---|---|
| QPSK | 5MHz | >4 | >100MHz | 4dB |
| QPSK | 5MHz | >4 | <=100MHz | 3dB |
| QPSK | 5MHz | <=4 | >100MHz | 20dB |
| QPSK | 5MHz | <=4 | <=100MHz | 10dB |

(51) Int. Cl.
 *H04W 52/36* (2009.01)
 *H04W 52/42* (2009.01)

(56) References Cited

U.S. PATENT DOCUMENTS

| | | | |
|---|---|---|---|
| 2007/0205843 | A1 | 9/2007 | Morimoto et al. |
| 2008/0233992 | A1* | 9/2008 | Oteri et al. ............... 455/522 |
| 2009/0040975 | A1* | 2/2009 | Vijayan et al. ............ 370/329 |
| 2010/0015967 | A1* | 1/2010 | Perets et al. ............ 455/422.1 |
| 2010/0029318 | A1 | 2/2010 | Tano et al. |
| 2010/0111023 | A1* | 5/2010 | Pelletier et al. ........... 370/329 |
| 2010/0158147 | A1* | 6/2010 | Zhang et al. ............. 375/260 |
| 2011/0026418 | A1* | 2/2011 | Bollea et al. ............. 370/252 |
| 2011/0274092 | A1* | 11/2011 | Liu et al. ................. 370/335 |

FOREIGN PATENT DOCUMENTS

| | | |
|---|---|---|
| JP | 2001-204072 A | 7/2001 |
| JP | 2008-060794 A | 3/2008 |
| JP | 2008-099092 A | 4/2008 |
| JP | 2008-527759 A | 7/2008 |
| JP | 2009-17193 A | 1/2009 |
| JP | 2009-507430 A | 2/2009 |
| WO | 2006/120297 A1 | 11/2006 |
| WO | 2007028077 A2 | 3/2007 |
| WO | 2007/060902 A1 | 5/2007 |

OTHER PUBLICATIONS

Office Action for Korean Application No. 10-2011-7026172 mailed Nov. 15, 2012, with English translation thereof (8 pages).
3GPP TS 36.101 v8.5.1, "3rd Generation Partnership Project; Technical Specification Group Radio Access Network; Evolved Universal Terrestrial Radio Access (E-UTRA); User Equipment (UE) Radio Transmission and Reception," (Release 8) (37 pages).
3GPP TSG-RAN4 Meeting #50 bis, R4-091366; "LTE-Advanced; UE Tx Characteristics," Motorola, Seoul, South Korea, Mar. 23-27, 2009 (5 pages).
Office Action for Japanese Application No. 2010-030749 mailed Jan. 10, 2012, with English translation thereof (7 pages).
International Search Report w/translation from PCT/JP2010/057171 dated Jul. 6, 2010 (3 pages).
3GPP TS 36.101 V8.5.1; "3rd Generation Partnership Project; Technical Specification Group Radio Access Network; Evolved Universal Terrestrial Radio Access (E-UTRA); User Equipment (UE) radio transmission and reception (Release 8)"; Mar. 2009; pp. 18-20 (4 pages).
3GPP TS 36.211 V8.3.0; "3rd Generation Partnership Project; Technical Specification Group Radio Access Network; Evolved Universal Terrestrial Radio Access (E-UTRA); Physical Channels and Modulation (Release 8)"; May 2008 (77 pages).
3GPP TR 36.913 V8.0.1; "3rd Generation Partnership Project; Technical Specification Group Radio Access Network; Requirements for further advancements for Evolved Universal Terrestrial Radio Access (E-UTRA) (LTE-Advanced) (Release 8)"; Mar. 2009 (15 pages).
3GPP TS 36.101 V8.2.0; "3rd Generation Partnership Project; Technical Specification Group Radio Access Network; Evolved Universal Terrestrial Radio Access (E-UTRA); User Equipment (UE) radio transmission and receiption (Release 8)"; May 2008 (66 pages).
3GPP TS 36.321 V8.2.0; "3rd Generation Partnership Project; Techncial Specification Group Radio Access Network; Evolved Universal Terrestrial Radio Access (E-UTRA) Medium Access Control (MAC) protocol specification (Release 8)"; May 2008 (33 pages).
Office Action for European Application No. 10769668.4 dated Nov. 5, 2012 (7 pages).
TSG-RAN Working Group 4 (Radio) meeting #50 bis, R4-091285; "Carrier aggregation: some UE aspects," Ericsson, Seoul, South Korea, Mar. 23-27, 2009 (7 pages).
3GPP TR 36.803 v1.1.0, "3rd Generation Partnership Project; Technical Specification Group Radio Access Network; Evolved Universal Terrestrial Radio Access (E-UTRA); User Equipment (UE) radio transmission and reception," (Release 8) (68 pages).
Patent Abstract for Japanese Publication No. 2008-099092 Published Apr. 24, 2008 (1 page).
Patent Abstract for Japanese Publication No. 05-048525 Published Feb. 26, 1993 (1 page).
Office Action for Japanese Application No. 2010-030749 dated Oct. 11, 2011, with English translation thereof (9 pages).
Office Action issued in corresponding Chinese Application No. 201080018532.8, mailed Aug. 5, 2013 (17 pages).
Office Action issued in corresponding Korean Application No. 10-2011-7026172, mailed Jul. 26, 2013 (5 pages).
Office Action issued in corresponding Australian Application No. 2010242680 mailed May 17, 2013 (3 pages).
Office Action issued in corresponding Japanese Application No. 2012-069671 mailed Dec. 3, 2013 (with translation) (6 pages).

* cited by examiner

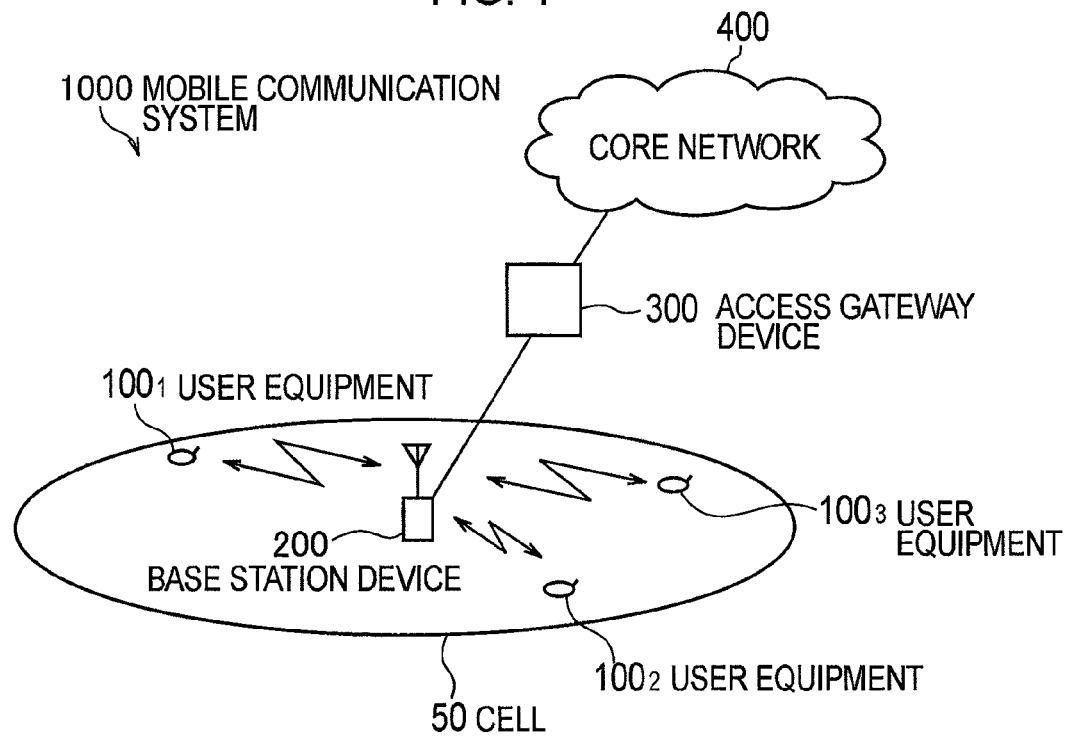
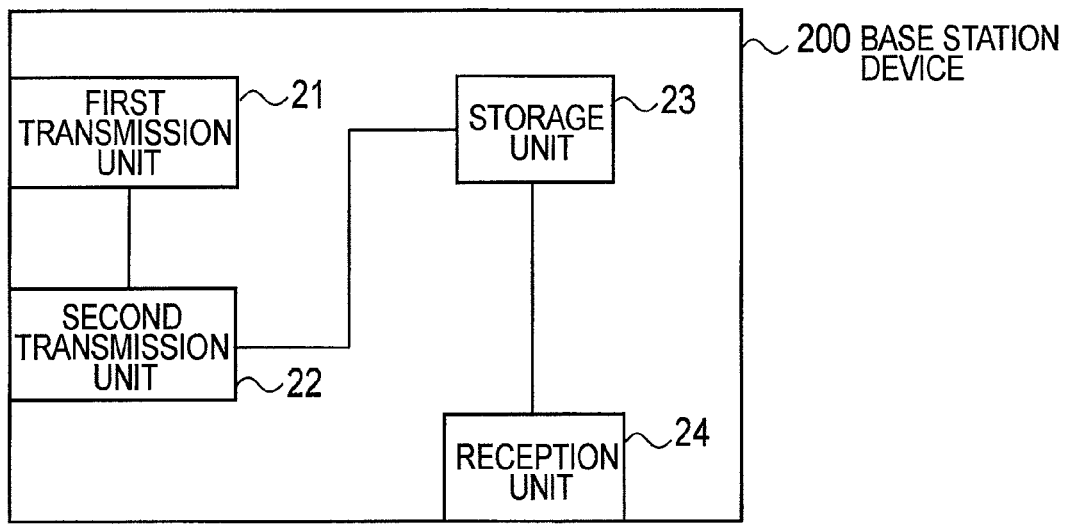

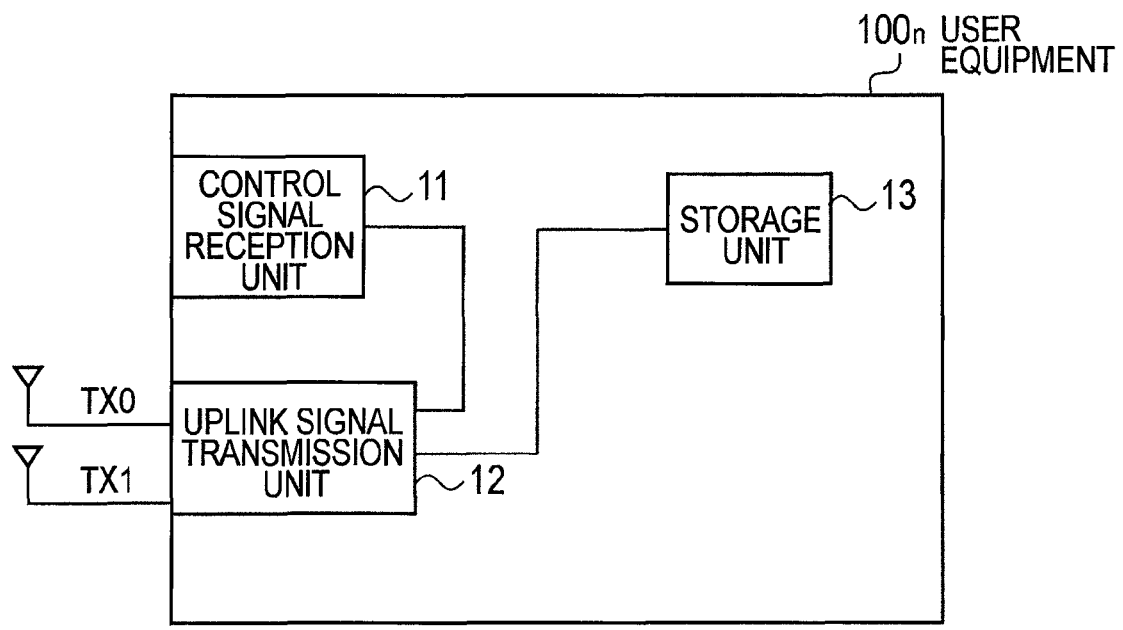

FIG. 4

$P_{PUSCH}(i) = \min\{P_{max}, 10\log_{10}(M_{PUSCH}(i)) + P_{O\_PUSCH}(i) + \alpha \cdot PL + \Delta_{TF}(i) + f(i)\}$ $P_{max}$: MAXIMUM TRANSMISSION POWER $M_{PUSCH}(i)$: THE NUMBER (SIZE OF FREQUENCY RESOURCE) OF RESOURCE BLOCKS FOR PUSCH AT SUBFRAME i $P_{O\_PUSCH}(i)$: PARAMETER FOR DETERMINING TRANSMISSION POWER OF USER EQUIPMENT AND VALUE CORRESPONDING TO TARGET $\alpha$: PARAMETER FOR DETERMINING TRANSMISSION POWER OF USER EQUIPMENT AND PARAMETER FOR APPLYING FRACTIONAL TPC.

PL: PASS LOSS BETWEEN BASE STATION DEVICE AND USER EQUIPMENT $\Delta_{TF}$: OFFSET VALUE ACCORDING TO MCS $f(i)$: ACCUMULATION VALUE OF TPC COMMAND OR TPC COMMAND ITSELF i: INDEX OF SUBFRAME

| MODULATION | CHANNEL BANDWIDTH / TRANSMISSION BANDWIDTH CONFIGURATION (dB) | | | | | | MPR (dB) |
|---|---|---|---|---|---|---|---|
| | 1.4 MHz | 3.0 MHz | 5 MHz | 10 MHz | 15 MHz | 20 MHz | |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |

| MODULATION | CHANNEL BW | TRANSMISSION BANDWIDTH CONFIGURATION (RB) | TRANSMISSION FREQUENCY | MPR |
|---|---|---|---|---|
| QPSK | 5MHz | >10 | <=1930MHz | 1dB |
| 16 QAM | 5MHz | <=20 | <=1935MHz | 1dB |
| 16 QAM | 5MHz | >=20 | <=1935MHz | 2dB |
| 64 QAM | 5MHz | >4 | <=1935MHz | 3dB |

FIG. 11

CASE0

| MODULATION | CHANNEL BW | TRANSMISSION BANDWIDTH CONFIGURATION (RB) | TRANSMISSION FREQUENCY | MPR |
|---|---|---|---|---|
| QPSK | 5MHz | >8 | <=1930MHz | 1dB |
| 16 QAM | 5MHz | >8 | <=1935MHz | 2dB |

CASE1

| MODULATION | CHANNEL BW | TRANSMISSION BANDWIDTH CONFIGURATION (RB) | TRANSMISSION FREQUENCY | MPR |
|---|---|---|---|---|
| QPSK | 5MHz | >8 | <=1930MHz | 2dB |
| 16 QAM | 5MHz | >8 | <=1935MHz | 3dB |

CASE2A

| MODULATION | CHANNEL BW | TRANSMISSION BANDWIDTH CONFIGURATION (RB) | TRANSMISSION FREQUENCY | MPR |
|---|---|---|---|---|
| QPSK | 5MHz | >4 | <=1930MHz | 3dB |
| 16 QAM | 5MHz | >4 | <=1935MHz | 4dB |

CASE2B

| MODULATION | CHANNEL BW | TRANSMISSION BANDWIDTH CONFIGURATION (RB) | TRANSMISSION FREQUENCY | MPR |
|---|---|---|---|---|
| QPSK | 5MHz | >4 | <=1930MHz | 4dB |
| 16 QAM | 5MHz | >4 | <=1935MHz | 5dB |

CASE2C

| MODULATION | CHANNEL BW | TRANSMISSION BANDWIDTH CONFIGURATION (RB) | TRANSMISSION FREQUENCY | MPR |
|---|---|---|---|---|
| QPSK | 5MHz | >4 | <=1930MHz | 6dB |
| 16 QAM | 5MHz | >4 | <=1935MHz | 7dB |

CASE3

| MODULATION | CHANNEL BW | TRANSMISSION BANDWIDTH CONFIGURATION (RB) | TRANSMISSION FREQUENCY | MPR |
|---|---|---|---|---|
| QPSK | 5MHz | >4 | <=1930MHz | 8dB |
| QPSK | 5MHz | <=4 | <=1930MHz | 15dB |
| 16 QAM | 5MHz | >4 | <=1935MHz | 9dB |
| QPSK | 5MHz | >4 | <=835MHz | 8dB |
| QPSK | 5MHz | <=4 | <=835MHz | 15dB |
| 16 QAM | 5MHz | >4 | <=835MHz | 9dB |

FIG. 12

| MODULATION | CHANNEL BW | TRANSMISSION BANDWIDTH CONFIGURATION (RB) | FREQUENCY INTERVALS AMONG A PLURALITY OF FREQUENCY CARRIERS | MPR |
|---|---|---|---|---|
| QPSK | 5MHz | >4 | >100MHz | 4dB |
| QPSK | 5MHz | >4 | <=100MHz | 3dB |
| QPSK | 5MHz | <=4 | >100MHz | 20dB |
| QPSK | 5MHz | <=4 | <=100MHz | 10dB |

USER EQUIPMENT, BASE STATION DEVICE, AND COMMUNICATION CONTROL METHOD

TECHNICAL FIELD

The present invention relates to a mobile communication technology field, and particularly to a user equipment, a base station device, and a communication control method, in a mobile communication system using a next generation mobile communication technology.

BACKGROUND ART

A communication scheme, which is the next generation of a WCDMA (Wideband Code Division Multiplexing Access) scheme, an HSDPA (High-Speed Downlink Packet Access) scheme, an HSUPA (High-Speed Uplink Packet Access) scheme and the like, that is, an LTE (Long Term Evolution) scheme has been discussed in the 3GPP, which is a standardizing group of the WCDMA, and specifying work of the LTE scheme has been conducted.

As a radio access scheme in the LTE scheme, an OFDMA (Orthogonal Frequency Division Multiplexing Access) scheme has been defined for a downlink, and an SC-FDMA (Single carrier Frequency Division Multiplexing Access) scheme has been defined for an uplink.

The OFDMA scheme denotes a multicarrier transmission scheme in which a frequency band is divided into a plurality of narrow frequency bands (subcarriers), and data is loaded on each subcarrier for transmission. According to the OFDMA scheme, subcarriers are densely arranged on the frequency axis while being orthogonal to one another, so that high-rate transmission is achieved, resulting in the improvement of frequency use efficiency.

The SC-FDMA scheme denotes a single carrier transmission scheme in which a frequency band is divided for each terminal, and transmission is performed using different frequency bands among a plurality of terminals. According to the SC-FDMA scheme, since it is possible to easily and efficiently reduce inter-terminal interference and suppress variation in transmission power, the SC-FDMA scheme is preferable in terms of low power consumption of a terminal, expansion of coverage and the like.

In the LTE scheme, communication is performed by allocating one or more RBs (Resource Blocks) to a mobile station in both a downlink and an uplink.

A base station device determines a mobile station, to which a resource block is to be allocated among a plurality of mobile stations, for each subframe (1ms in the LTE scheme) (this process will be called "scheduling").

In a downlink, the base station device transmits a shared channel signal to a mobile station, which is selected through the scheduling, by using one or more resource blocks. In an uplink, the mobile station selected through the scheduling transmits a shared channel signal to the base station device by using one or more resource blocks.

In addition, the shared channel signal is a signal on a PUSCH (Physical Uplink Shared Channel) in terms of an uplink, and is a signal on a PDSCH (Physical Downlink Shared Channel) in terms of a downlink.

Furthermore, in the LTE scheme, for initial connection and the like, Random Access is used. A channel for the random access is called a PRACH (Physical Random Access Channel).

Furthermore, the mobile station transmits a random access preamble via the physical random access channel.

Furthermore, as a communication scheme which is the next generation of the LTE scheme, an LTE-Advanced scheme has been discussed in the 3GPP.

In the LTE-Advanced scheme, performing "Carrier aggregation" has been agreed as the requirements. Here, the "Carrier aggregation" represents that communication is simultaneously performed using a plurality of carriers.

For example, when the "Carrier aggregation" is performed in the uplink, since the mobile station performs transmission using different carriers for each "Component Carrier", it represents that an uplink signal is transmitted using a plurality of carriers. Furthermore, it has been discussed that multicarrier transmission is performed even in one "Component Carrier".

In addition, the multicarrier transmission represents that two or more single carrier transmissions are simultaneously performed.

For example, in a component carrier configured by 100 resource blocks, when performing single carrier transmission using 20 resource blocks, it is regarded as single carrier transmission. However, when simultaneously performing two single carrier transmissions of the above-mentioned 20 resource blocks, it is regarded as multicarrier transmission.

In the latter case, a UE performs transmission using a total of 40 resource blocks in a system band configured by 100 resource blocks. Furthermore, in the latter case, even when single carriers including the 20 resource blocks are adjacent to each other, it is also regarded as multicarrier transmission.

Furthermore, in the above-mentioned example, one component carrier exists. However, even when two or more component carriers exist and a plurality of single carrier transmissions are simultaneously performed in the two or more component carriers, it is also regarded as multicarrier transmission.

However, a cellular phone system, a radio astronomy system, a satellite communication system, an air/sea radar system, an earth resources survey system, and a radio LAN system, which are systems using a radio wave, generally separate frequency bands to be used in order to prevent mutual interference. Furthermore, for example, among frequency bands allocated for a cellular phone system, frequency bands allocated for a plurality of systems exist, and frequency bands of each system are separated from each other.

That is, a system using a radio wave separates frequency bands to be used, thereby preventing inter-system interference.

However, since a transmitter radiating a radio wave radiates an unnecessary wave (hereinafter, referred to as adjacent channel interference) in an outer band of a frequency band of an own system, although a frequency band has been separated, mutual interference occurs among a plurality of adjacent systems. Therefore, when a power level of the unnecessary wave is high, it has a significant adverse influence on adjacent systems.

In order to prevent the adverse influence on the adjacent systems due to such adjacent channel interference, performance related to characteristics related to the above-mentioned adjacent channel interference and spurious emission is defined in each system.

However, in order to suppress the unnecessary wave to the outer band of the frequency band of the above-mentioned own system, the mobile station should be provided with a power amplifier with high linearity.

Therefore, when considering the cost and size of the mobile station, it may be difficult to reduce the above-mentioned unnecessary wave or satisfy the regulations of the above-mentioned adjacent channel interference and spurious emission.

Reducing maximum transmission power is called "Maximum power reduction (MPR)". For example, in the LTE scheme, the MPR is defined on the basis of a modulation method, a system bandwidth, and the number of resource blocks. The maximum transmission power is reduced in this way, so that it is possible to further reduce the cost and size of the mobile station.

As described above, the LTE-Advanced scheme, which is the next generation of the LTE scheme, has been currently discussed in the 3GPP. In the LTE-Advanced mobile communication system, a mobile station can transmit an uplink signal through a multicarrier using a plurality of transmission antennas or transmitters. Furthermore, even when using one transmission antenna or transmitter, the mobile station can transmit the uplink signal through the multicarrier.

However, in the LTE-Advanced mobile communication system, when the mobile station has transmitted the uplink signal through the multicarrier using the plurality of transmission antennas or transmitters, a problem may occur in which an interference amount to frequency bands of adjacent systems is increased, as compared with the case in which the mobile station has transmitted the uplink signal through a single carrier using one transmission antenna or transmitter. The problem also exists in the case in which the uplink signal is transmitted through a multicarrier using one transmission antenna or transmitter.

Therefore, the present invention has been achieved in view of the above-described problems, and an object thereof is to provide a user equipment, a base station device, and a communication control method, which can reduce an interference amount to frequency bands of adjacent systems even when transmitting an uplink signal through a multicarrier using a plurality of transmission antennas or transmitters, or one transmission antenna or transmitter.

SUMMARY OF THE INVENTION

The first feature of the present invention is summarized in that a user equipment configured to execute radio communication with a base station device in a mobile communication system, the user equipment comprising, a control signal reception unit configured to receive a control signal providing instructions to transmit an uplink signal and an uplink signal transmission unit configured to transmit the uplink signal to the base station device on a basis of the control signal, the uplink signal transmission unit is configured to set a maximum value of transmission power of the uplink signal to be smaller than rated power defined by the mobile communication system on a basis of at least one of a parameter notified by the control signal and a number of transmission antennas or transmitters used for transmission of an uplink signal.

The second feature of the present invention is summarized in that a base station device for communicating with a user equipment in a radio manner in a mobile communication system, the base station device comprising, a first transmission unit configured to transmit information on a reduction of maximum transmission power to the user equipment and a second transmission unit configured to transmit a control signal providing instructions to transmit an uplink signal, information on the reduction of the maximum transmission power is used for notifying a reduction amount of maximum transmission power determined on a basis of at least one of a parameter notified by the control signal and a number of transmission antennas or transmitters used for transmission of an uplink signal.

The third feature of the present invention is summarized in that a communication control method for controlling radio communication between a user equipment and a base station device in a mobile communication system, the mobile communication method comprising a step A of receiving a control signal providing instructions to transmit an uplink signal and a step B of transmitting the uplink signal to the base station device on a basis of the control signal, in the step B, a maximum value of transmission power of the uplink signal is set to be smaller than rated power defined by the mobile communication system on a basis of at least one of a parameter notified by the control signal and a number of transmission antennas or transmitters used for transmission of an uplink signal.

As has been described above, according to the present invention, it is possible to provide a user equipment, a base station device, and a communication control method, which can reduce an interference amount to frequency bands of adjacent systems even when transmitting an uplink signal through a multicarrier using a plurality of transmission antennas or transmitters, or one transmission antenna or transmitter.

BRIEF DESCRIPTION OF THE DRAWINGS

FIG. 1 is an entire configuration diagram of a mobile communication system according to a first embodiment of the present invention.

FIG. 2 is a functional block diagram of a base station device according to the first embodiment of the present invention.

FIG. 3 is a functional block diagram of a user equipment according to the first embodiment of the present invention.

FIG. 4 is a diagram illustrating an example of an equation used when a user equipment according to the first embodiment of the present invention determines transmission power in a PUSCH.

FIG. 11 is a diagram illustrating an example of a table for an MPR used in a mobile communication system according to the first embodiment of the present invention.

FIG. 12 is a diagram illustrating an example of a table for an MPR used in a mobile communication system according to the first embodiment of the present invention.

DETAILED DESCRIPTION

Figure 5:
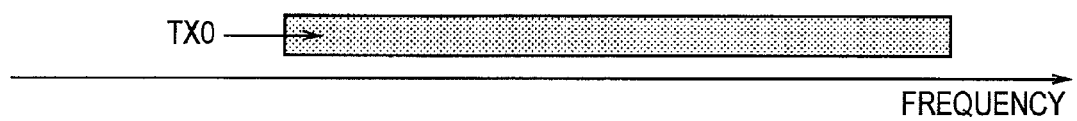
FIG. 5 is a diagram illustrating an example of a transmission method of an uplink signal in a user equipment according to the first embodiment of the present invention.

Configuration of Mobile Communication System According to First Embodiment of the Present Invention With reference to the accompanying drawings, a mobile communication system according to a first embodiment of the present invention will be explained. In all drawings for explaining the present embodiment, the same reference numerals are used to designate elements having the same function, and redundant description will not be repeated.

With reference to FIG. 1, a mobile communication system including a user equipment 100n and a base station device 200 according to the present embodiment will be explained.

A mobile communication system 1000, for example, is a system which employs an "Evolved UTRA and UTRAN (another name: Long Term Evolution or Super 3G)" scheme or an LTE-advanced scheme.

The mobile communication system 1000 includes the base station device (eNB: eNodeB) 200, a plurality of user equipments 100n (1001, 1002, 1003, . . . , 100n, n is an integer>0) which communicate with the base station device 200.

The base station device 200 is connected to an upper station, for example, an access gateway device 300, and the access gateway device 300 is connected to a core network 400. The mobile station 100n communicates with the base station device 200 using the "Evolved UTRA and UTRAN" scheme in a cell 50. In addition, the access gateway device 300 may be called an MME/SGW (Mobility Management Entity/Serving Gateway).

Since each user equipment (1001, 1002, 1003, . . . , 100n) has the same configuration, function and state, the user equipment 100n will be representatively explained below unless specifically stated otherwise. Here, a user equipment (UE) executes radio communication with the base station device 200, and may be a mobile station, a mobile terminal, or a fixed terminal.

In the mobile communication system 1000, as a radio access scheme, an "OFDMA (Orthogonal Frequency Division Multiplexing Access) scheme" is applied to a downlink, and an "SC-FDMA (Single carrier Frequency Division Multiplexing Access) scheme" is applied to an uplink.

As described above, the OFDMA scheme denotes a multicarrier transmission scheme in which a frequency band is divided into a plurality of narrow frequency bands (subcarriers), data is mapped to each subcarrier, and communication is performed. Furthermore, the SC-FDMA scheme denotes a single carrier transmission scheme in which a frequency band is divided for each terminal, and a plurality of terminals use frequency bands different from each other, so that inter-terminal interference can be reduced.

In addition, in the LTE-advanced scheme, it has been agreed that "Carrier Aggregation" is performed.

In a downlink, communication having used a plurality of "Component Carriers" is performed. Here, the "Component Carrier" corresponds to one system carrier in the LTE scheme. That is, in the LTE scheme, communication is performed using one "Component Carrier". However, in the LTE-advanced scheme, communication may also be performed using two or more "Component Carriers".

In an uplink, communication may be performed using two or more "Component Carriers". Furthermore, in the LTE scheme, single carrier transmission is basically performed. However, in the LTE-advanced scheme, multicarrier transmission may be performed.

Here, the multicarrier transmission may include multicarrier transmission over a plurality of "Component Carriers", multicarrier transmission in one "Component Carrier", or multicarrier transmission over a plurality of "Component Carriers" and even in one "Component Carrier".

That is, the multicarrier transmission represents that two or more single carrier transmissions are simultaneously performed. Furthermore, the single carrier corresponds to a single carrier transmitted using the SC-FDMA (Single-Carrier Frequency Division Multiplexing Access) in the LTE. Otherwise, the single carrier transmission corresponds to single carrier transmission by way of DFT-Spread OFDM.

For example, in a component carrier configured by 100 resource blocks, when performing single carrier transmission having used 20 resource blocks, it is regarded as single carrier transmission. However, when simultaneously performing two single carrier transmissions of the above-mentioned 20 resource blocks, it is regarded as multicarrier transmission.

In the latter case, a UE performs transmission using the total 40 resource blocks in a system band configured by 100 resource blocks. Furthermore, in the latter case, even when single carriers configured by 20 resource blocks are adjacent to each other, it is also regarded as multicarrier transmission.

Furthermore, in the above-mentioned example, one component carrier exists. However, even when two or more component carriers exist and a plurality of single carrier transmissions are simultaneously performed in the two or more component carriers, it is also regarded as multicarrier transmission.

Hereafter, a communication channel used in the "Evolved UTRA and UTRAN (LTE)" scheme will be explained. In addition, a communication channel illustrated below is also used in the LTE-advanced.

For a downlink, a PDSCH (Physical Downlink Shared Channel) and a PDCCH (Physical Downlink Control Channel) are used, which are shared by each user equipment 100n.

User data, that is, a normal data signal is transmitted through the PDSCH (Physical Downlink Shared Channel). Furthermore, information (i.e., downlink scheduling information) on a transport format of the ID and user data of a user, who performs communication using the PDSCH, information (i.e., uplink scheduling information) on a transport format of the ID and user data of a user, who performs communication using a PUSCH (Physical Uplink Shared Channel), and the like are notified by the PDCCH.

The PDCCH may be called a "Downlink L1/L2 Control Channel". Furthermore, the "downlink scheduling information" and the "uplink scheduling grant" may be collectively called "Downlink Control Information (DCI)".

Furthermore, in the downlink, a "BCCH: Broadcast Control Channel" is transmitted as a logic channel.

A part of the BCCH is mapped to a "BCH: Broadcast Channel" which is a transport channel, and information mapped to the BCH is transmitted to the user equipment 100n in a corresponding cell through a "P-BCH (Physical Broadcast Channel)" which is a physical channel.

Furthermore, a part of the BCCH is mapped to a "DL-SCH (Downlink Shared Channel)" which is a transport channel, and information mapped to the DL-SCH is transmitted to the user equipment 100n in the corresponding cell through the "PDSCH" which is a physical channel.

A broadcast channel transmitted through the BCCH/DL-SCH/PDSCH may be called a Dynamic Broadcast Channel (D-BCH).

For an uplink, a PUSCH and a PUCCH shared by each user equipment 100n are used. User data, that is, a normal data signal is transmitted through the PUSCH.

Furthermore, downlink quality information (CQI: Channel Quality Indicator), which is used for a scheduling process and an AMCS (Adaptive Modulation and Coding Scheme) of the PDSCH, and transmission confirmation information (Acknowledgement Information) of the PDSCH, are transmitted through the PUCCH.

The downlink quality information may also be called a CSI (Channel State Indicator) which is an indicator putting together a CQI, a PMI (Pre-coding Matrix Indicator) and an RI (Rank Indicator).

Furthermore, the content of the transmission confirmation information is expressed by one of a positive response (ACK: Acknowledgement) indicating that a transmission signal has been appropriately received, and a negative response (NACK: Negative Acknowledgement) indicating that the transmission signal has not been appropriately received.

In addition, when the transmission timing of the above-mentioned CQI or transmission confirmation information is the same as the transmission timing of the PUSCH, the CQI or the transmission confirmation information may be transmitted and multiplexed to the PUSCH.

As illustrated in FIG. 2, the base station device 200 includes a first transmission unit 21, a second transmission unit 22, a storage unit 23, and a reception unit 24.

The first transmission unit 21 is configured to transmit information (hereinafter, referred to as Additional Spectrum Emission information) on regulations regarding spurious emission to be satisfied by the user equipment 100n and an Additional MPR for the regulations to the user equipment 100n.

That is, the information on the regulations regarding the spurious emission to be satisfied by the user equipment 100n and the Additional MPR for the regulations, that is, the Additional Spectrum Emission information corresponds to information on the regulations of the spurious emission to be satisfied.

The Additional Spectrum Emission information may be held in the storage unit 23 and transmitted to the first transmission unit 21.

For example, the first transmission unit 21 may be configured to transmit the Additional Spectrum Emission information to the user equipment 100n according to an RRC message or broadcast information. The Additional Spectrum Emission information and detailed description of a value of MPR/A-MPR associated with this information will be given later.

The second transmission unit 22 is configured to transmit a control signal providing instructions to transmit an uplink signal. For example, the second transmission unit 22 may be configured to transmit an "uplink scheduling grant" via the PDCCH as the control signal.

In addition, the second transmission unit 22 may perform a process of receiving information on the MPR/A-MPR from the storage unit 23 and not transmitting a control signal instructing a configuration of an uplink signal to which the MPR/A-MPR is applied.

In other words, the second transmission unit 22 may perform a process of receiving the information on the MPR/A-MPR from the storage unit 23 and transmitting a control signal instructing a configuration of an uplink signal, to which the MPR/A-MPR is not applied, to the user equipment 100n on the basis of the information on the MPR/A-MPR.

Here, the information on the MPR/A-MPR may include the value of the MPR/A-MPR determined on the basis of the number of transmission antennas or transmitters, the number of transmission carriers, and modulation methods, number of resource blocks, transmission frequencies and the like of each transmission carrier when a plurality of transmission carriers exist, as will be explained later.

Furthermore, the value of the MPR/A-MPR may be determined on the basis of Capability information on uplink transmission of the LTE-Advanced scheme for the user equipment 100n, in addition to the number of the transmission antennas or the transmitters, the number of the transmission carriers, the modulation methods, the number of resource blocks, the transmission frequencies and the like of each transmission carrier when the plurality of transmission carriers exist.

Furthermore, the value of the MPR/A-MPR may be determined on the basis of the Additional Spectrum Emission information, in addition to the number of the transmission antennas or the transmitters, the number of the transmission carriers, the modulation methods, the number of resource blocks, the transmission frequencies and the like of each transmission carrier when the plurality of transmission carriers exist.

Otherwise, the second transmission unit 22 may perform a process of receiving the information on the MPR/A-MPR from the storage unit 23 and not transmitting a control signal instructing a configuration of an uplink signal, in which the value of the MPR/A-MPR is equal to or more than a predetermined threshold value, on the basis of the information on the MPR/A-MPR.

In other words, the second transmission unit 22 may perform a process of receiving the information on the MPR/A-MPR from the storage unit 23 and transmitting a control signal instructing a configuration of an uplink signal, in which the value of the MPR/A-MPR is not equal to or more than the predetermined threshold value, on the basis of the information on the MPR/A-MPR.

As described above, by not instructing the configuration of the uplink signal, to which the MPR/A-MPR is applied or in which the value of the MPR/A-MPR is not equal to or less than the predetermined threshold value, the transmission of the uplink signal to the user equipment 100n is instructed. However, the transmission by a required transmission power is not performed because of the A-MPR. As a result, it is possible to prevent the occurrence that a transmission characteristic deteriorates, and therefore, it is possible to improve the system efficiency.

In addition, detailed description of the information on the MPR determined in advance will be given later.

Furthermore, detailed description of the Additional Spectrum Emission information and the value of the MPR/A-MPR associated with this information will be given later.

Furthermore, the Capability information on the uplink transmission of the LTE-Advanced scheme may be notified from the user equipment 100n as will be explained later. Detailed description of the value of the MPR associated with the Capability information on the uplink transmission of the LTE-Advanced scheme will be given later.

Information included in a control signal notified by the uplink scheduling grant may include at least one of the number of transmission carriers configuring an uplink signal, a number of resource blocks of the uplink signal, a modulation method of the uplink signal, a transmission frequency of the uplink signal, and the number of transmission antennas or transmitters for transmitting the uplink signal.

In addition, the number of resource blocks may be specified as the number of resource blocks. A number of resource blocks of one resource block in the LTE and LET-Advanced is 180 kHz, and the number of the resource blocks is specified, so that the number of resource blocks is uniquely determined.

Furthermore, the transmission frequency may be specified as a position of a resource block. In general, since information for specifying a center frequency of a system band or a frequency of the system band is notified to a user equipment through broadcast information and the like, the position of the resource block in the system band, which is related to the transmission signal of the uplink, is specified, so that the transmission frequency of an uplink signal is uniquely determined.

When 2 or more is specified as the number of transmission carriers configuring an uplink signal by the uplink scheduling grant, multicarrier transmission is performed in an uplink. In such a case, the multicarrier transmission may be instructed by one uplink scheduling grant, or the multicarrier transmission may also be instructed by two or more uplink scheduling grants.

When the multicarrier transmission is instructed by two or more uplink scheduling grants, one uplink scheduling grant may correspond to each carrier transmission.

Furthermore, in the uplink, the uplink transmission is triggered by the uplink scheduling grant. In addition, there are a periodic uplink signal transmission such as a transmission of CQI/PMI (Pre-coding Indicator)/RI (Rank Indicator) by PUCCH, and a transmission of ACK/NACK which is transmission confirmation information on a PDSCH, and an uplink signal transmission triggered by the downlink transmission.

The multicarrier transmission in an uplink according to the present invention may include multicarrier transmission based on a combination of transmission of an uplink signal in the state in which a transmission instruction of an uplink signal triggered by the uplink scheduling grant, periodic transmission of an uplink signal, and transmission of an uplink signal in the state in which downlink transmission has been triggered, as well as multicarrier transmission in the state in which a transmission instruction of an uplink signal triggered by the uplink scheduling grant.

The combination may also include multicarrier transmission using a plurality of periodic transmissions of an uplink signal, multicarrier transmission using transmission of an uplink signal in the state in which a plurality of downlink transmissions have been triggered, and the like.

The storage unit 23 is configured to store the information on the MPR/A-MPR.

For example, the storage unit 23 may be configured to store the information on the MPR/A-MPR determined in advance. For example, the information on the MPR/A-MPR determined in advance may be defined as a part of the operation of the user equipment 100n in the specifications for defining the operation of a user equipment in a mobile communication system.

Otherwise, for example, the storage unit 23 may be configured to store the information on the regulations regarding the spurious emission to be satisfied by the user equipment 100n and the A-MPR for the regulations.

The A-MPR is an additional MPR applied in order to satisfy regulations regarding predetermined spurious emission, and the presence and absence of the application of the A-MPR, for example, may be notified from the base station device 200 to the user equipment 100n through broadcast information or an RRC message.

That is, as described above, the presence and absence of the application of the A-MPR may also be notified from the base station device 200 to the user equipment 100n through the Additional Spectrum Emission information.

Otherwise, the storage unit 23 may be configured to store the Capability information on the uplink transmission of the LTE-Advanced scheme, which is notified from the user equipment 100n through the RRC message, and store the value of the MPR/A-MPR based on the Capability information.

In such a case, the value of the MPR/A-MPR may be determined on the basis of the number of the transmission antennas or the transmitters, the number of the transmission carriers, the modulation methods, the number of resource blocks, the transmission frequencies of each transmission carrier when the plurality of transmission carriers exist, the Capability information and the like. In such a case, the storage unit 23 receives the Capability information from the reception unit 24.

When the Capability information on the uplink transmission of the LTE-Advanced scheme is transmitted from the user equipment 100n, the reception unit 24 receives the Capability information.

The reception unit 24 notifies the storage unit 23 of the Capability information. The Capability information, for example, may be notified through the RRC message. More particularly, the Capability information may also be transmitted as a part of "UE capability", or as information different from the "UE capability".

As illustrated in FIG. 3, the user equipment 100n includes a control signal reception unit 11, an uplink signal transmission unit 12, and a storage unit 13.

The control signal reception unit 11 is configured to receive a control signal providing instructions to transmit an uplink signal (Particularly, a data signal transmitted via the PUSCH).

Particularly, the control signal reception unit 11 may be configured to receive the "uplink scheduling grant" via the PDCCH as the control signal.

The control signal may include at least one of the number of uplink transmission carriers, a number of resource blocks of an uplink signal, a modulation method of the uplink signal, and a transmission frequency of the uplink signal as a parameter.

Here, when the uplink signal is configured by two or more transmission carriers, the control signal may include at least one of a number of resource blocks of each of the two or more transmission carriers, a modulation method of each of the two or more transmission carriers, and a transmission frequency of each of the two or more transmission carriers as a parameter.

Furthermore, at least one of the number of the transmission antennas or the transmitters for transmitting the uplink signal may be notified by the uplink scheduling grant, in addition to the above-mentioned parameter.

The uplink signal transmission unit 12 is configured to transmit the uplink signal to the base station device 200 on the basis of the control signal received in the control signal reception unit 11.

Here, the uplink signal transmission unit 12 is configured to calculate transmission power of the uplink signal and transmission power in a PUSCH.

For example, the uplink signal transmission unit 12 is configured to calculate transmission power PPUSCH (i) in the PUSCH at a subframe i based on: maximum transmission power (rated power defined by the mobile communication system 1000) Pmax; MPUSCH, a resource block the number for the PUSCH at the subframe i; a parameter PO_PUSCH (i); a parameter a; a propagation loss (path loss) PL between the base station device 200 (a connection destination of the PUSCH) and the user equipment 100n; an offset value ATF corresponding to "Modulation and Coding Scheme (MCS)"; and a TPC command f(i) according to the subframe i received from the base station device 200.

For example, the uplink signal transmission unit 12 may be configured to calculate the transmission power PPUSCH (i) in the PUSCH at the subframe i using an equation illustrated in FIG. 4.

Here, the uplink signal transmission unit 12 sets the thus-calculated transmission power PPUSCH (i) in the PUSCH to be equal to or less than maximum transmission power Pmax.

More particularly, when the transmission power PPUSCH (i) in the PUSCH calculated using the equation illustrated in FIG. 4 is larger than the above-mentioned maximum transmission power Pmax, the uplink signal transmitting unit 12 sets the transmission power PPUSCH (i) in the PUSCH to have the same value as the maximum transmission power Pmax.

Furthermore, the uplink signal transmission unit 12 may be configured to transmit an uplink signal using one of patterns 0 to 3 illustrated in FIGS. 5 to 8.

<Pattern 0>

As illustrated in FIG. 5, the uplink signal transmission unit 12 may be configured to transmit an uplink signal through a single carrier using one transmission antenna or transmitter, that is, TX0.

In such a case, it may be possible to apply MPR (Maximum Power Reduction) or A-MPR (Additional Maximum Power Reduction) applied to the LTE.

<Pattern 1>

Figure 6:
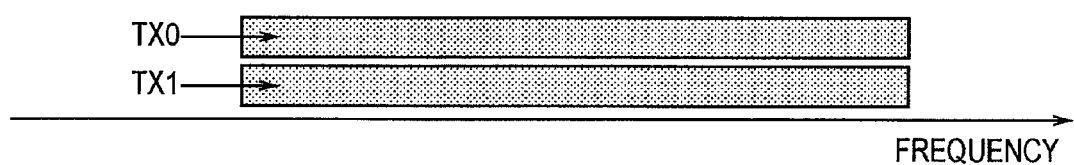
FIG. 6 is a diagram illustrating an example of a transmission method of an uplink signal in a user equipment according to the first embodiment of the present invention.
Figure 7:
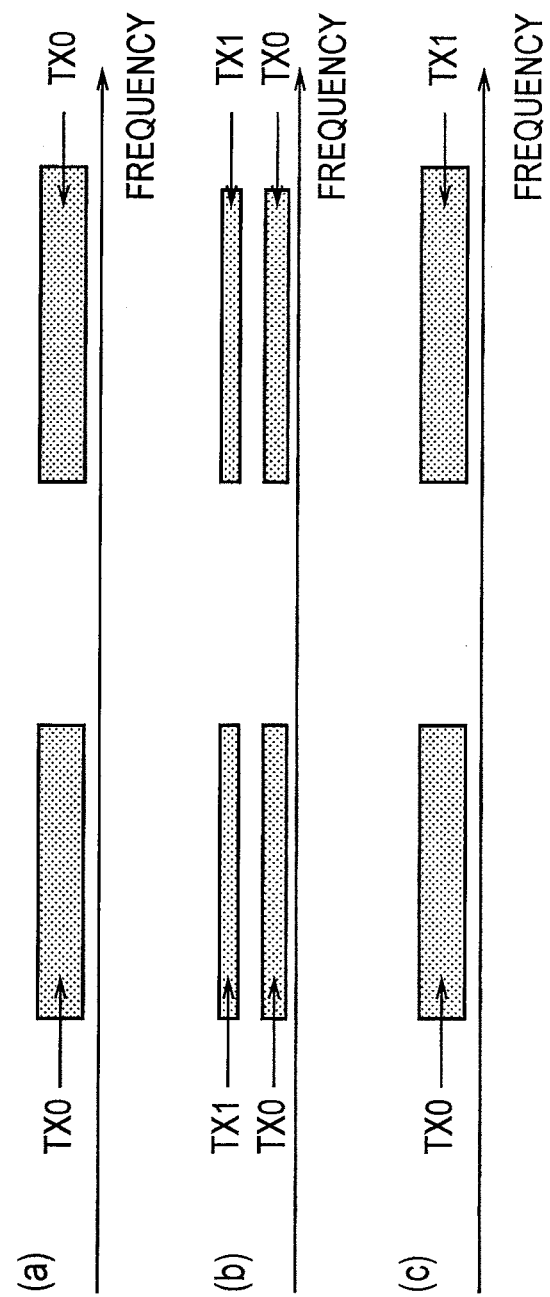
FIG. 7 is a diagram illustrating an example of a transmission method of an uplink signal in a user equipment according to the first embodiment of the present invention.

As illustrated in FIG. 6, the uplink signal transmission unit 12 may be configured to transmit an uplink signal through a single carrier using two transmission antennas or transmitters, that is, TX0 and TX1.

In the pattern 1, due to the use of the two transmission antennas or transmitters, that is, the TX0 and TX1, since directionality occurs, it is probable that interference power to an adjacent channel becomes large. In other words, in the case of the pattern 2B, in order to reduce interference power to an adjacent channel, it is necessary to apply a further large MPR.

In general, since the number of reception antennas of the base station device 200 is 2, the present pattern corresponds to communication using MIMO (Multiple Input Multiple Output). In communication using 2×2 MIMO, two types of modes, that is, a mode when the number of streams is 1 and a mode when the number of the streams is 2, may be defined. Here, the number of the streams may be called a "rank". The rank may be notified from the base station device 200 to the user equipment 100n using the uplink scheduling grant.

<Pattern 2>

As illustrated in FIG. 7(a) to FIG. 7(c), the uplink signal transmission unit 12 may be configured to transmit an uplink signal through a multi-carrier in the same frequency band using one transmission antenna or transmitter, that is, TX0, or two transmission antennas or transmitters, that is, TX0 and TX1.

In pattern 2A illustrated in FIG. 7(a), the uplink signal transmission unit 12 may be configured to perform multi-carrier transmission in one transmission antenna or transmitter, that is, TX0.

Furthermore, in pattern 2B illustrated in FIG. 7(b), the uplink signal transmission unit 12 may be configured to perform multi-carrier transmission in each of the two transmission antennas or transmitters, that is, TX0 and TX1.

Furthermore, in pattern 2C illustrated in FIG. 7(c), the uplink signal transmission unit 12 may be configured to perform single carrier transmission in each of the two transmission antennas or transmitters, that is, TX0 and TX1. In such a case, when considering only the TX0 or when considering only the TX1, single carrier transmission is performed.

As with the patterns 2A and 2B, when performing multi-carrier transmission in each transmission antenna or transmitter, it is probable that a PAPR (Peak-to-Average Power Ratio) increases.

When the PAPR is large, it is necessary to reduce interference to an adjacent channel to another system due to spurious emission by increasing the linearity of a power amplifier or applying a further large MPR.

Furthermore, in the pattern 2B, similarly to the case of the pattern 1, due to the use of the two transmission antennas or transmitters, that is, the TX0 and TX1, since directionality occurs, it is probable that interference power to an adjacent channel becomes large. In other words, in the case of the pattern 2B, in order to reduce interference power to an adjacent channel, it is necessary to apply a further large MPR.

Furthermore, as with the patterns 2A, 2B, and 2C, when achieving the multi-carrier transmission, it is probable that spurious emission occurs due to the occurrence of Intermodulation products (IM products).

<Pattern 3>

Figures 8, 9, 10:
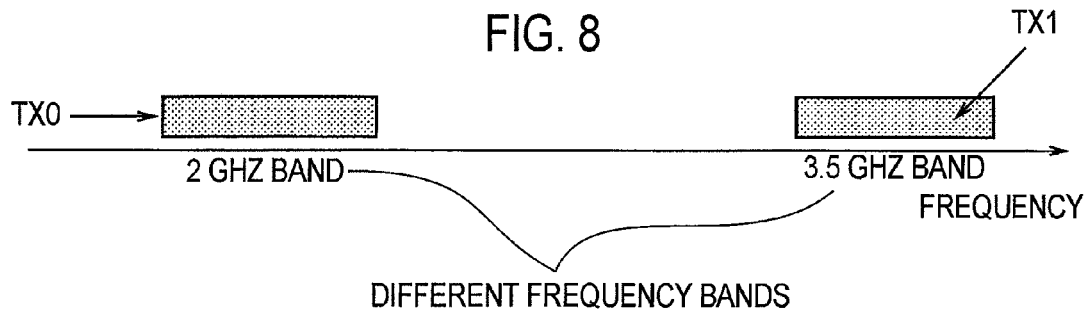
FIG. 8 is a diagram illustrating an example of a transmission method of an uplink signal in a user equipment according to the first embodiment of the present invention.
FIG. 9 is a diagram illustrating an example of a table for an MPR used in a mobile communication system according to the first embodiment of the present invention.
FIG. 10 is a diagram illustrating an example of a table for an MPR used in a mobile communication system according to the first embodiment of the present invention.

As illustrated in FIG. 8, the uplink signal transmission unit 12 may be configured to transmit an uplink signal through a multi-carrier in different frequency bands using two transmission antennas or transmitters, that is, TX0 and TX1.

In the pattern 3, when simultaneously transmitting uplink signals in different frequency bands, it is probable that spurious emission occurs due to the occurrence of IM products.

In addition, even if multi-carrier transmission is performed in the different frequency bands, when the frequency difference between the different frequency bands is small, transmission may be performed with the configuration illustrated in FIG. 7(a).

Furthermore, in the pattern 3, as compared with the case of the patterns 2A, 2B, and 2C, since frequencies of the two carriers are separated from each other, it is probable that influence of interference occurs up to a further frequency.

Here, the frequency band may include different frequency bands. A frequency band in the LTE or LTE-Advanced scheme is defined in "5.5 Operating bands" of the 3GPP TS36.101.

For example, an uplink frequency in Band1 is 1920 MHz to 1980 MHz and an uplink frequency in Band6 is 830 MHz to 840 MHz.

In such a case, when simultaneously transmitting a transmission carrier (a transmission carrier in the Band1) with a center frequency of 1940 MHz and a transmission carrier (a transmission carrier in the Band6) with a center frequency of 835 MHz, the two transmission carriers are regarded as signals in frequency bands different from each other.

Furthermore, on the contrary, when simultaneously transmitting a transmission carrier (a transmission carrier in the Band1) with a center frequency of 1940 MHz and a transmission carrier (a transmission carrier in the Band1) with a center frequency of 1960 MHz, the two transmission carriers are regarded as signals in the same frequency band.

As illustrated in FIGS. 5 to 8, it is considered that the influence of interference to an adjacent channel or another system changes depending on the number of transmission carriers or the number of transmission antennas or transmitters.

Thus, the uplink signal transmission unit 12 may be configured to set a maximum value of transmission power of an uplink signal to be smaller than the maximum transmission power (the rated power defined by the mobile communication system 1000) Pmax on the basis of at least one of the parameter notified by the control signal and the number of the transmission antennas or transmitters used for the transmission of an uplink signal.

Particularly, the uplink signal transmission unit 12 is configured to determine an "MPR (dB)" on the basis of at least one of the parameter notified by the control signal and the number of the transmission antennas or transmitters used for the transmission of the uplink signal, and reduce the above-mentioned maximum transmission power Pmax by the determined "MPR (dB)".

The parameter, for example, includes the number of transmission carriers, and modulation methods, number of resource blocks, transmission frequencies and the like of each transmission carrier when a plurality of transmission carriers exist.

For example, the uplink signal transmission unit 12 may be configured to manage the table illustrated in FIG. 9 for each transmission antenna or transmitter, select an "MPR (dB)" corresponding to a combination of a number of resource blocks "Channel bandwidth/Transmission bandwidth configuration (RB)" of an uplink signal and a modulation method "Modulation" of the uplink signal with reference to the table, and reduce the above-mentioned maximum transmission power Pmax by the selected "MPR (dB)".

Otherwise, for example, the uplink signal transmission unit 12 may also be configured to manage the table illustrated in FIG. 9 for each transmission carrier, instead of managing the table illustrated in FIG. 9 for each transmission antenna or transmitter, select an "MPR (dB)" corresponding to the combination of the number of resource blocks "Channel bandwidth/Transmission bandwidth configuration (RB)" of the uplink signal and the modulation method "Modulation" of the uplink signal with reference to the table, and reduce the above-mentioned maximum transmission power Pmax by the selected "MPR (dB)".

As a more specific example, a case is considered in which an uplink signal is transmitted using two transmission carriers.

It is assumed that a system bandwidth of a system band, to which a first transmission carrier is mapped, is 5 MHz, the number of RBs of the transmission carrier is 20, and a modulation method of the transmission carrier is a QPSK.

Furthermore, it is assumed that a system bandwidth of a system band, to which a second transmission carrier is mapped, is 10 MHz, the number of RBs of the transmission carrier is 30, and a modulation method of the transmission carrier is a 16 QAM.

In such a case, an MPR related to the first transmission carrier is "1 dB" and an MPR related to the second transmission carrier is "2 dB".

In addition, as described above, when the MPR related to the first transmission carrier is "1 dB" is different from the MPR related to the second transmission carrier is "2 dB", the respective MPRs may be applied to the respective transmission carriers, a maximum MPR may be applied to all the transmission carriers, or a minimum MPR may be applied to all the transmission carriers.

Otherwise, for example, the uplink signal transmission unit 12 may also be configured to manage the table illustrated in FIG. 10 for each transmission carrier, select an "MPR (dB)" corresponding to the combination of the number of resource blocks "Channel bandwidth/Transmission bandwidth configuration (RB)" of the uplink signal, the modulation method "Modulation" and the "transmission frequency" of the uplink signal with reference to the table, and reduce the above-mentioned maximum transmission power Pmax by the selected "MPR (dB)".

In addition, FIG. 10 illustrates only the table when the system bandwidth (Channel Bandwidth) is 5 MHz. However, the same table may be defined for system bandwidths with different frequencies other than 5 MHz.

For example, a case is considered in which an uplink signal is transmitted using two transmission carriers. It is assumed that a system bandwidth of a system band, to which a first transmission carrier is mapped, is 5 MHz, the number of RBs of the transmission carrier is 20, and a modulation method of the transmission carrier is a QPSK.

Furthermore, it is assumed that a system bandwidth of a system band, to which a second transmission carrier is mapped, is 5 MHz, the number of RBs of the transmission carrier is 5, and a modulation method of the transmission carrier is a 64 QAM.

In such a case, an MPR related to the first transmission carrier is "1 dB" and an MPR related to the second transmission carrier is "3 dB".

Otherwise, for example, the uplink signal transmission unit 12 may also be configured to manage the tables illustrated in FIG. 11 for the above-mentioned Case 0, Case 1, Case 2A, Case 2B, Case 2C, and Case 3, select "MPRs (dB)" corresponding to the combination of the number of resource blocks "Channel bandwidth/Transmission bandwidth configuration (RB)" of the uplink signal, and the modulation method "Modulation" and the "transmission frequency" of the uplink signal with reference to the tables, and reduce the above-mentioned maximum transmission power Pmax by the selected "MPR (dB)".

In addition, FIG. 11 illustrates only the table when the system bandwidth (Channel Bandwidth) is 5 MHz. However, the same table may be defined for system bandwidths with different frequencies other than 5 MHz.

In addition, in relation to the tables illustrated in FIG. 11, when two or more transmission antennas or transmitters exist, a common table may be defined in the two or more transmission antennas or transmitters, or a table may be defined for each transmission antenna or transmitter.

Furthermore, in relation to the tables illustrated in FIG. 11, when two or more transmission carriers exist, a common table may be defined in the two or more transmission carriers, or a table may be defined for each transmission carrier.

Furthermore, in the tables illustrated in FIG. 11, the MPR is determined on the basis of the number of transmission antennas or transmitters, the modulation method, the number of transmission carriers, the Channel BW, the number of resource blocks, the transmission frequency and the like. However, the MPR may be determined on the basis of a part of these items.

Otherwise, for example, when two or more transmission carriers are transmitted, the uplink signal transmission unit 12 may also be configured to determine the MPR on the basis of intervals among the frequencies of the two or more transmission carriers as illustrated in FIG. 12.

That is, the uplink signal transmission unit 12 may also be configured to manage the table illustrated in FIG. 12, select an "MPR (dB)" corresponding to a combination of a number of resource blocks "Channel bandwidth/Transmission bandwidth configuration (RB)" of an uplink signal, a modulation method "Modulation" "of the uplink signal, and frequency intervals among a plurality of frequency carriers with reference to the table, and reduce the above-mentioned maximum transmission power Pmax by the selected "MPR (dB)".

For example, in FIG. 12, when frequency intervals among a plurality of frequency carriers are large, since Inter-modulation products occur in a frequency away from a system band, it is regarded that the influence of interference to another system is large and the value of the MPR is set to be large. When the frequency intervals among the plurality of frequency carriers are small, since the Inter-modulation products occur in a frequency near the system band, it is regarded that the influence of the interference to another system is small and the value of the MPR is set to be small.

In addition, FIG. 12 illustrates only the table when the system bandwidth (Channel Bandwidth) is 5 MHz. However, the same table may be defined for system bandwidths with different frequencies other than 5 MHz.

Furthermore, FIG. 12 illustrates only the table when the Modulation is the QPSK. However, the same table may be defined for Modulation other than the QPSK.

Furthermore, in the table illustrated in FIG. 12, the transmission frequency (an absolute value) is defined as a parameter. However, the transmission frequency (the absolute value) may be additionally defined.

In the above-mentioned FIG. 9, FIG. 10, FIG. 11, or FIG. 12, the MPR is determined on the basis of the number of the transmission antennas or transmitters, the modulation method, the number of the transmission carriers, the Channel BW, the number of resource blocks, the transmission frequency and the like. However, additionally, a metric such as a Cubic Metric or a PAPR may be defined and the MPR may be determined on the basis of the metric, wherein the metric may be used for estimating the influence of adjacent channel interference. In such a case, in FIG. 9, FIG. 10, FIG. 11, or FIG. 12, the metric may be added as a parameter for determining the MPR.

The above-mentioned cases in FIG. 9, FIG. 10, FIG. 11 or FIG. 12 may be defined in association with regulations regarding spurious emission, such as a need of satisfying spurious emission specifications to a PHS band, a need of satisfying spurious emission specifications to Public Safety, or a need of satisfying an FCC mask in America. In such a case, the tables illustrated in FIG. 9, FIG. 10, FIG. 11 or FIG. 12 may be defined for each regulation regarding spurious emission.

In addition, the tables illustrated in FIG. 9, FIG. 10, FIG. 11 or FIG. 12 may also be associated with the Additional Spectrum Emission information notified from the base station device 200 through broadcast information or an RRC message.

That is, the storage unit 13 of the user equipment 100*n* may receive the Additional Spectrum Emission information transmitted from the first transmission unit of the base station device 200, and refer to the table corresponding to the Additional Spectrum Emission information, so that an MPR (in such a case, it may be called an A-MPR in the meaning of an additional MPR) may be applied on the basis of the table specified by the base station device 200.

In addition, in the above-mentioned operation, indexes may be defined as the Additional Spectrum Emission information, and the tables illustrated in FIG. 9, FIG. 10, FIG. 11 or FIG. 12 may be defined for each index.

The Additional Spectrum Emission information is notified through the broadcast information or the RRC message, so that it is possible to provide a mobile communication system capable of realizing uplink transmission employing the LTE-Advanced scheme with appropriate UE complexity while reducing interference to another system using a method suitable for each region or the whole country.

Hereinafter, the present operation and effect will be explained in detail.

As described above, one object of the present invention is to realize uplink transmission employing the LTE-Advanced scheme with appropriate UE complexity while reducing interference to another system.

Here, the other system may be generally different in each region and each country. For example, a PHS system exists in Japan, but does not exist in Europe and America.

Therefore, in the case in which the uplink transmission employing the LTE-Advanced scheme is performed, even if it is necessary to lower the maximum transmission power because interference occurs in the PHS system, it is not necessary to lower the maximum transmission power in Europe and America, that is, it is possible to perform the uplink transmission employing the LTE-Advanced scheme causing the occurrence of interference in the PHS system.

On the contrary, in Japan where the PHS system exists, it is necessary to employ an additional MPR (A-MPR) in order to prevent interference from occurring in the PHS system.

For these reasons, the above-mentioned Additional Spectrum Emission information is notified from the base station device 200 to the user equipment 100*n* through the broadcast information or the RRC message, so that it is possible to provide a mobile communication system capable of realizing the uplink transmission employing the LTE-Advanced scheme with appropriate UE complexity while reducing interference to another system using a method suitable for each region or the whole country.

In addition, the uplink transmission employing the LTE-Advanced scheme in the above description, for example, corresponds to at least one of the transmissions illustrated by the above-mentioned patterns 0 to 3.

In addition, in the above-mentioned examples, the tables illustrated in FIG. 9, FIG. 10, FIG. 11 or FIG. 12 are associated with the Additional Spectrum Emission information notified from the base station device 200 through the broadcast information or the RRC message. However, instead, the tables may be associated with Capability information on the uplink transmission in the LTE-Advanced scheme.

That is, the storage unit 13 of the user equipment 100*n* stores the Capability information on the uplink transmission employing the LTE-Advanced scheme and the user equipment 100*n* refers to the table corresponding to the Capability information on the uplink transmission employing the LTE-Advanced scheme, so that an MPR (in such a case, it may be called an A-MPR in the meaning of an additional MPR) may be applied on the basis of the table specified by the Capability of the user equipment 100*n*.

Here, the Capability information on the uplink transmission, employing the LTE-Advanced scheme, for example, may be configured by the number of transmission antennas or transmitters of the user equipment 100*n*, the number of transmission carriers which can be transmitted, a modulation method which can be transmitted, a maximum value (a maximum value of the number of streams) of MIMO ranks which can be transmitted, a maximum transmission rate which can be transmitted, a maximum data size which can be transmitted at one subframe, a frequency band which can be transmitted, the number of Resource Aggregations which can be transmitted, the propriety of Resource Aggregation according to different frequency bands, and the like.

In addition, in the above-mentioned operation, indexes may be defined as the Capability information on the uplink transmission employing the LTE-Advanced scheme, and the tables illustrated in FIG. 9, FIG. 10, FIG. 11 or FIG. 12 may be defined for each index.

In addition, the uplink transmission employing the LTE-Advanced scheme in the above description, for example, corresponds to at least one of the transmissions illustrated by the above-mentioned patterns 0 to 3.

The Capability information on the uplink transmission employing the LTE-Advanced scheme may also be notified from the uplink signal transmission unit 12 to the base station device 200.

In such a case, as described above, since the base station device 200 determines whether to transmit the uplink scheduling grant on the basis of the Capability information on the uplink transmission employing the LTE-Advanced scheme, it is possible to reduce a wasteful uplink scheduling grant, resulting in the improvement of the system transmission efficiency.

In addition, the Capability information on the uplink transmission employing the LTE-Advanced scheme may also be transmitted as a part of "UE Capability", or as information different from the "UE Capability".

In general, in the user equipment 100$n$, since high requirements are required for a size, a battery charge time, and a terminal cost in the case of a handset, and low requirements are required for a size, a battery charge time, and a terminal cost in the case of a communication device embedded in a PC, there exist the cases in which it is possible to mount an expensive Power amplifier in order to satisfy ACLR regulations and spurious emission regulations, or vice versa.

Consequently, an MPR is applied on the basis of the Capability information on the uplink transmission employing the LTE-Advanced scheme, so that it is possible to provide communication optimal for the above-mentioned various requirements.

That is, a large MPR is applied to a terminal (e.g., a handset) requiring high requirements for a cost, a size, and a battery charge time, thereby enabling communication using the LTE-Advanced scheme even when using a low priced Power amplifier, and a small MPR is applied to a terminal (e.g., a terminal embedded in a PC) requiring high requirements for a cost, a size, and a battery charge time, thereby enabling communication with further large transmission power, resulting in the improvement of transmission characteristics such as an increase in throughput.

Figure 13:
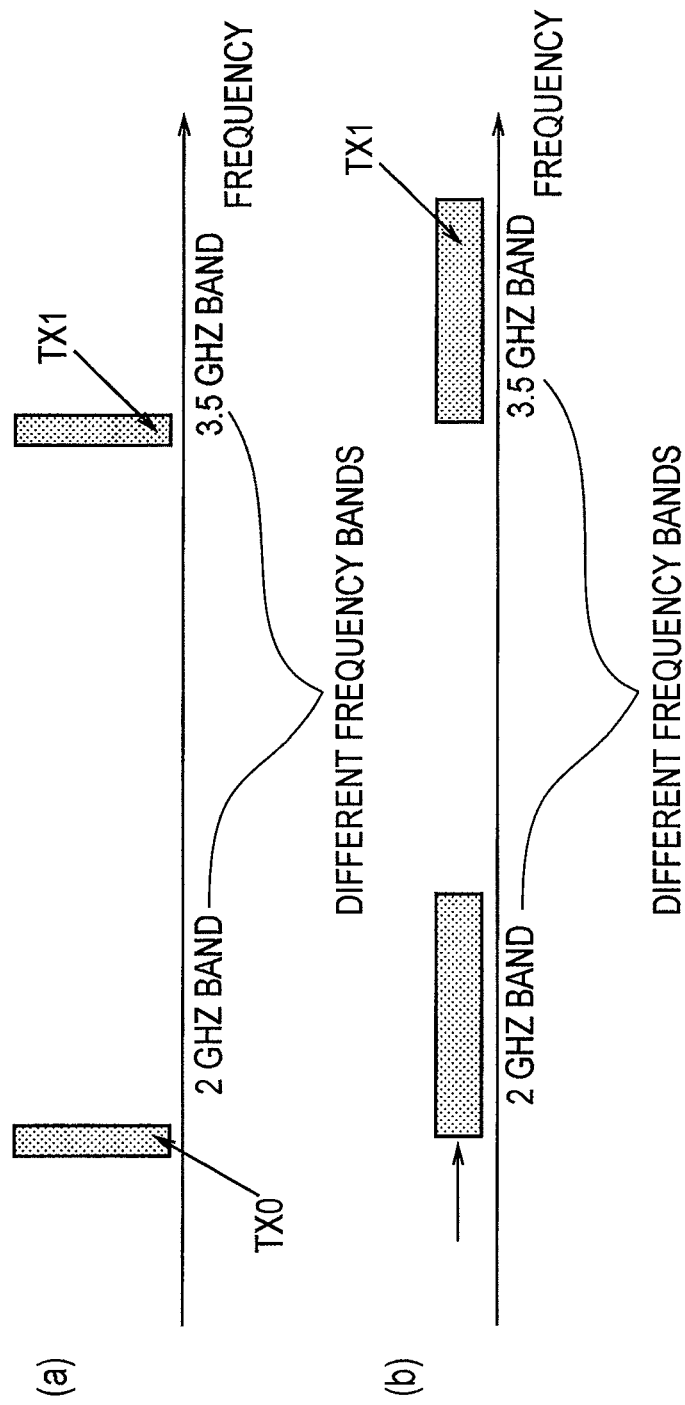
FIG. 13 is a diagram illustrating an example of a transmission method of an uplink signal in a user equipment according to the first embodiment of the present invention.

Furthermore, when transmitting an uplink signal with patterns illustrated in FIG. 13($a$) and FIG. 13($b$), power density per band is large in the case of the pattern of FIG. 13($a$), resulting in an increase in an interference amount to an adjacent channel or interference to a band to which spurious regulations are applied.

Therefore, the uplink signal transmission unit 12 may also be configured to set an "MPR (dB)" applied in the case of the pattern of FIG. 13($a$) to be larger than an "MPR (dB)" applied in the case of the pattern of FIG. 13($b$).

That is, the uplink signal transmission unit 12 may also be configured to control the "MPR (dB)" on the basis of the number of resource blocks of an uplink signal.

More particularly, in the case in which transmission is performed using two or more transmission carriers, the uplink signal transmission unit 12 may perform control such that the value of the "MPR (dB)" becomes large when the number of resource blocks of the uplink signal is small, and the value of the "MPR (dB)" becomes small when the number of resource blocks of the uplink signal is large.

Furthermore, additionally, in the case in which transmission is performed using two or more transmission carriers, the uplink signal transmission unit 12 may perform control such that the value of the "MPR (dB)" becomes large when frequency intervals between the two or more transmission carriers are large, and the value of the "MPR (dB)" becomes small when the frequency intervals between the two or more transmission carriers are small. Since the effect obtained by determining the value of the MPR on the basis of the frequency intervals between the two or more transmission carriers is the same as the description using FIG. 12, the redundant description will not be repeated.

Furthermore, as described above, the uplink signal transmission unit 12 may also be configured to transmit the Capability information on the uplink transmission in the LTE-Advanced scheme to the base station device 200.

The Capability information on the uplink transmission in the LTE-Advanced scheme may be transmitted as an RRC message. Furthermore, the Capability information on the uplink transmission in the LTE-Advanced scheme may be held in the storage unit 13, and be notified from the storage unit 13 when transmitting the Capability information to the base station device 200.

The storage unit 13 is configured to store information on an MPR, or information (hereinafter, also referred to as Additional Spectrum Emission information) on the regulations regarding spurious emission to be satisfied by the user equipment 100$n$ and the Additional MPR for the regulations.

For example, the storage unit 13 may be configured to store the Additional Spectrum Emission information notified from the base station device 200 through the RRC message or the broadcast information.

Otherwise, the storage unit 13 may also be configured to store information on an MPR determined in advance. For example, the MPR information determined in advance may be used for determining maximum transmission power of a user equipment in the mobile communication system.

Otherwise, the storage unit 13 may also be configured to store the Capability information on the uplink transmission using the LTE-Advanced scheme of the user equipment 100$n$.

Since detailed description regarding the value of the MPR associated with the Capability information on the uplink transmission using the LTE-Advanced scheme is the same as the description using FIG. 9, FIG. 10, FIG. 11 and FIG. 12, the redundant description will not be repeated.

The storage unit 13 notifies the uplink signal transmission unit 12 of the above-mentioned Additional Spectrum Emission information, value of the MPR associated with the Additional Spectrum Emission information, information on the MPR determined in advance, Capability information on the uplink transmission using the LTE-Advanced scheme, and value of the MPR associated with the Capability information.

In addition, in the above-mentioned example, the value of an MPR to be applied is determined on the basis of the number of transmission antennas or transmitters, the number of transmission carriers, and modulation methods, number of resource blocks, transmission frequencies and the like of each transmission carrier when a plurality of transmission carriers exist. Additionally, the value of the MPR may also be determined on the basis of the rank (the number of streams) in the MIMO.

Operation of Mobile Communication System According to the First Embodiment of the Present Invention With reference to FIG. 14, the operation of the mobile communication system according to the first embodiment of the present invention, particularly, the operation of a user equipment according to the first embodiment of the present invention will be explained.

Figure 14:
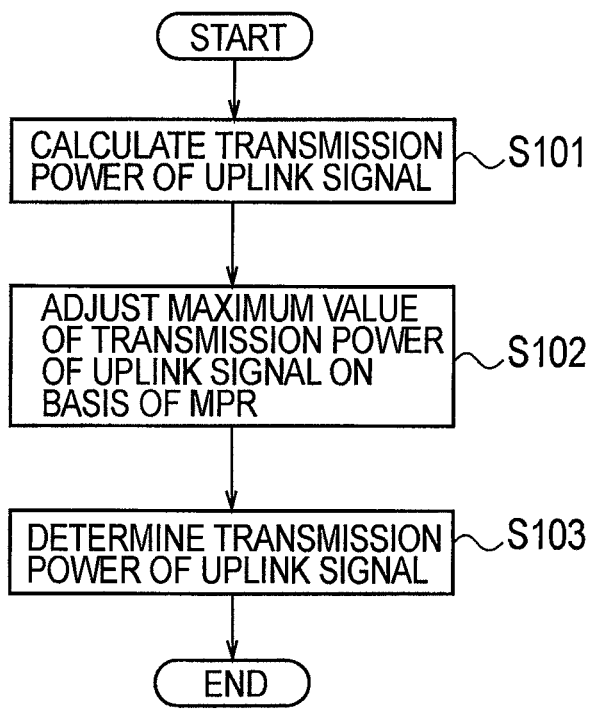
FIG. 14 is a flowchart illustrating the operation of a user equipment according to the first embodiment of the present invention.

As illustrated in FIG. 14, in step S101, when the control signal, for example, the "uplink scheduling grant", is received via the PDCCH, the user equipment 100$n$ calculates the transmission power of the uplink signal, and the transmission power PPUSCH (i) in the PUSCH as described above.

In step S102, the user equipment 100$n$ determines the "MPR (dB)" on the basis of at least one of the parameter notified by the control signal and the number of transmission antennas or transmitters used for the transmission of the uplink signal, and reduces the above-mentioned maximum transmission power (the rated power defined by the mobile communication system 1000) Pmax by the "MPR (dB)".

Here, the maximum transmission power when the MPR has been applied is calculated as follows:

(the maximum transmission power when the MPR has been applied)=Pmax−MPR

That is, when the MPR is applied, the value of the maximum transmission power is reduced by the MPR.

In step S103, the user equipment 100*n* sets the transmission power PPUSCH (i) in the PUSCH, which has been calculated in step S101, to be equal to or less than the maximum transmission power Pmax. Here, the maximum transmission power Pmax is maximum transmission power when the MPR has been applied.

Then, the user equipment 100*n* transmits an uplink signal (a data signal) with the transmission power PPUSCH (i), which has been set in step S103, via the PUSCH.

In addition, in the above-mentioned example, the uplink signal transmission unit 12 transmits the PUSCH as the uplink signal. Instead, the uplink signal transmission unit 12 may also transmit a channel or a signal other than the PUSCH.

Here, the channel other than the PUSCH, for example, includes a PUCCH, a PRACH and the like. For example, a CQI, an ACK/NACK, a Scheduling Request and the like may also be transmitted via the PUCCH. Furthermore, an RA preamble signal may also be transmitted via the PRACH. Furthermore, the signal other than the PUSCH, for example, includes a Sounding Reference Signal (Sounding RS), a Demodulation Reference Signal (Demodulation RS) and the like.

Even in relation to the channel or the signal other than the PUSCH, similarly to the case of the PUSCH, the MPR is determined on the basis of the number of transmission antennas or transmitters, the number of transmission carriers, and modulation methods, number of resource blocks, transmission frequencies and the like of each transmission carrier when a plurality of transmission carriers exist, and uplink transmission, that is, the transmission of the channel or the signal other than the PUSCH is performed such that uplink transmission power is equal to or less than the maximum transmission power to which the MPR has been applied.

Operation and Effect of the Mobile Communication System According to the First Embodiment of the Present Invention In accordance with the mobile communication system according to the first embodiment of the present invention, the user equipment 100*n* controls the "MPR (dB)" on the basis of at least one of the parameters (the number of uplink transmission carriers, the number of resource blocks of an uplink signal regarding each transmission carrier, the modulation method of the uplink signal regarding each transmission carrier, and the transmission frequency of the uplink signal regarding each transmission carrier) notified by a control signal, and the number of transmission antennas or transmitters used for the transmission of the uplink signal, thereby setting the transmission power of the uplink signal suitable for the above-mentioned patterns 0 to 3.

The characteristics of this embodiment as described above may be represented as follows.

A first characteristic of this embodiment is summarized in that a user equipment 100*n* configured to execute radio communication with a base station device 200 in a mobile communication system 1000, the user equipment 100*n* comprising, a control signal reception unit 11 configured to receive a control signal providing instructions to transmit an uplink signal and an uplink signal transmission unit 12 configured to transmit the uplink signal to the base station device 200 on a basis of the control signal, the uplink signal transmission unit 12 is configured to set a maximum value of transmission power of the uplink signal to be smaller than rated power defined by the mobile communication system 1000 on a basis of at least one of a parameter notified by the control signal and a number of transmission antennas or transmitters used for transmission of an uplink signal.

A first characteristic of this embodiment is summarized in that the parameter includes at least one of a number of transmission carriers of the uplink signal, a number of resource blocks of the uplink signal, a modulation method of the uplink signal, and a transmission frequency of the uplink signal.

A first characteristic of this embodiment is summarized in that when the uplink signal is configured by two or more transmission carriers, the parameter includes at least one of number of resource blocks of the respective two or more transmission carriers, modulation methods of the respective two or more transmission carriers, transmission frequencies of the respective two or more transmission carriers, and transmission frequency intervals among the two or more transmission carriers.

A first characteristic of this embodiment is summarized in that a reception unit 13 configured to receive information on regulations of spurious emission to be satisfied from the base station device 200, the uplink signal transmission unit 12 is configured to set the maximum value of the transmission power of the uplink signal to be smaller than the rated power defined by the mobile communication system 1000 on a basis of at least one of the parameter notified by the control signal, the number of the transmission antennas or the transmitters used for transmission of an uplink signal, and the information on the regulations of the spurious emission to be satisfied.

A second characteristic of this embodiment is summarized in that a base station device 200 for communicating with a user equipment 100*n* in a radio manner in a mobile communication system 1000, the base station device 200 comprising, a first transmission unit 21 configured to transmit information on a reduction of maximum transmission power to the user equipment 100*n* and a second transmission unit 22 configured to transmit a control signal providing instructions to transmit an uplink signal, information on the reduction of the maximum transmission power is used for notifying a reduction amount of maximum transmission power determined on a basis of at least one of a parameter notified by the control signal and a number of transmission antennas or transmitters used for transmission of an uplink signal.

A second characteristic of this embodiment is summarized in that the parameter includes at least one of a number of transmission carriers of the uplink signal, a number of resource blocks of the uplink signal, a modulation method of the uplink signal, and a transmission frequency of the uplink signal.

A second characteristic of this embodiment is summarized in that when the reduction amount of the maximum transmission power is equal to or more than a predetermined threshold value, the second transmission unit 22 is configured not to instruct the transmission of an uplink signal.

A third characteristic of this embodiment is summarized in that a communication control method for controlling radio communication between a user equipment 100 and a base station device 200 in a mobile communication system 1000, the mobile communication method comprising, a step A of receiving a control signal providing instructions to transmit an uplink signal and a step B of transmitting the uplink signal to the base station device 200 on a basis of the control signal, in the step B, a maximum value of transmission power of the uplink signal is set to be smaller than rated power defined by the mobile communication system 1000 on a basis of at least one of a parameter notified by the control signal and a number of transmission antennas or transmitters used for transmission of an uplink signal.

The transmission antenna or transmitter in the user equipment 100n in first embodiment for this invention, for example, may be defined as function unit including all transmitter configured to Power amplifier and transmitter, or one of the function unit of transmitter configured to Power amplifier and transmitter.

Note that operation of the above described the user equipment 100n and the base station device 200 may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the user equipment 100n and the base station device 200. Also, the storage medium and the processor may be provided in the user equipment 100n and the base station device 200 as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A user equipment configured to execute multicarrier communication over two or more component carriers in uplink with a base station device in a mobile communication system, the user equipment comprising:
   a control signal reception unit configured to receive a control signal providing instructions to transmit an uplink signal based on the two or more component carriers in the uplink; and
   an uplink signal transmission unit configured to transmit the uplink signal to the base station device on a basis of the control signal, wherein the control signal includes at least one of a number of resource blocks of the uplink signal, a modulation method of the uplink signal, and transmission frequency of the uplink signal, wherein
   the uplink signal transmission unit is configured to set a maximum value of transmission power of the uplink signal to be smaller than rated power defined by the mobile communication system on a basis of a modulation method of the uplink signal, the number of resource blocks of the uplink signal, and frequency intervals among a plurality of frequency carriers of the uplink signal.

2. A communication control method for executing multi-carrier communication over a plurality of component carriers in an uplink between a user equipment and a base station device in a mobile communication system, the mobile communication method comprising:
   a step A of receiving a control signal providing instructions to transmit an uplink signal based on the plurality of component carriers in the uplink; and
   a step B of transmitting the uplink signal to the base station device on a basis of the control signal, wherein the control signal includes at least one of a number of resource blocks of the uplink signal, a modulation method of the uplink signal, and transmission frequency of the uplink signal, wherein
   in the step B, a maximum value of transmission power of the uplink signal is set to be smaller than rated power defined by the mobile communication system on a basis of a modulation method of the uplink signal, the number of resource blocks of the uplink signal, and frequency intervals among a plurality of frequency carriers of the uplink signal.

* * * * *